United States Patent [19]

Killen

[11] Patent Number: 4,531,368

[45] Date of Patent: Jul. 30, 1985

[54] RESERVOIR FOR A MULTI-PUMP HYDRAULIC SYSTEM

[75] Inventor: Dale H. Killen, Colona, Ill.

[73] Assignee: Deere & Company, Moline, Ill.

[21] Appl. No.: 562,657

[22] Filed: Dec. 19, 1983

[51] Int. Cl.[3] .............................................. F16D 33/02

[52] U.S. Cl. ........................................ 60/453; 60/454; 60/456; 137/592

[58] Field of Search ................. 60/453, 454, 456, 486, 60/484; 137/590, 592, 567, 340; 165/140; 141/186; 210/286, 323.2, 167, 171

[56] References Cited

U.S. PATENT DOCUMENTS

| | | | |
|---|---|---|---|
| 3,002,355 | 10/1961 | Brackin | 60/52 |
| 3,065,601 | 11/1962 | Comfort | 60/456 |
| 3,682,197 | 8/1972 | Snyder | 137/592 |
| 3,885,389 | 5/1975 | Hull | 60/453 |
| 3,993,094 | 11/1976 | Spooner | 137/588 |
| 4,127,143 | 11/1978 | Zinga | 137/592 |
| 4,210,176 | 7/1980 | Emming | 417/304 |
| 4,371,318 | 2/1983 | Kime | 137/573 |
| 4,451,369 | 5/1984 | Sekino et al. | 210/323.2 |

FOREIGN PATENT DOCUMENTS

| | | | |
|---|---|---|---|
| 2041851 | 9/1980 | United Kingdom | 60/456 |

*Primary Examiner*—Robert E. Garrett
*Assistant Examiner*—John M. Husar

[57] ABSTRACT

In a hydraulic system for a combine harvester, each of three subsystems is supplied with fluid through its own individual reservoir outlet. The total return flows from the three subsystems is distributed between two inlet ports of the reservoir. A pair of wire mesh delivery tubes is connected between the respective return inlet ports and two of the outlet ports. The hydraulic circuitry is arranged so that the return flow at each inlet port exceeds the supply flow demanded at the corresponding outlet port so that, while some of the return fluid is directly recirculated through the delivery tube to that outlet, there is a net flow outwards through the wire mesh of the tubes to mix with the fluid supply held in the reservoir.

16 Claims, 3 Drawing Figures

RESERVOIR FOR A MULTI-PUMP HYDRAULIC SYSTEM

BACKGROUND OF THE INVENTION

The invention concerns hydraulic systems in which a reservoir serves more than one subsystem, and in which each subsystem includes means such as a pump for withdrawing its own supply of fluid from the reservoir. The invention is particularly applicable to an off-the-road machine such as a combine harvester.

The "dwell" time of returned fluid in the reservoir of a hydraulic system is time for de-aeration of the fluid, for cooling, and for settling out of contaminants. Typically, among several subsystems served by one reservoir, the tolerance level for adverse fluid condition factors such as entrained air, fluid temperature variations, contaminants and lack of positive head, varies according to the duty or function of the subsystem. If a simple reservoir is used, with little attempt to differentiate the withdrawal of fluid among the various systems, then the reservoir must have sufficient volumetric capacity, preferably with some reserve, to provide fluid in a condition compatible with the most sensitive or least tolerant subsystem. This requires one or more comparatively large capacity reservoirs, with the attendant disadvantages of comparatively high bulk, weight and cost. This solution is unattractive for mobile equipment, especially self-propelled machines with hydrostatic transmission and a variety of powered elements, such as combine harvesters in the agricultural field or, say, elevating scrapers in the construction equipment field. In these fields, control of overall machine size and weight are prime design requirements and systems permitting smaller reservoirs of higher power/volume ratio can make an important contribution. (The ratio is that of the total hydraulic power of a system to the volumetric capacity of the reservoir which serves it.)

The power/volume ratio of hydraulic reservoirs may be improved somewhat by such well known measures as the use of diffusers at return inlets and internal baffling-see, for example, U.S. Pat. No. 3,993,094, Spooner. But the known methods are basically passive and the requirements of the most sensitive subsystem still have a disproportionate influence on reservoir size so that possible gains are relatively limited.

To reduce problems arising from excessive turbulence common at the return inlet of a conventional reservoir, Brackin (U.S. Pat. No. 3,002,355) suggests, for a reservoir serving a single hydraulic circuit consisting of one pump and related actuator, an internal substantially closed passage between outlet and inlet. However, this arrangement essentially recirculates fluid without enhancement of fluid condition and offers little more than a surge tank function.

Kime (U.S. Pat. No. 4,371,318) attacks the pump cavitation problem by providing a "supplemental pressurization system", including a hydraulic fluid accumulator in the fluid supply line on the inlet side of the pump. But again, this is a single circuit hydraulic system and addresses only the cavitation problem.

None of the known hydraulic reservoir arrangements are especially adapted to serving a hydraulic system having two or more subsystems or to taking advantage of the opportunities in fluid management which such systems offer.

SUMMARY OF THE INVENTION

Accordingly, it is an object of the invention to provide a hydraulic system in which a given reservoir serves each of a plurality of subsystems with a discrete flow of hydraulic fluid of condition, with respect to air entrainment, temperature, presence of contaminants and head, compatible with the requirements of that subsystem, while minimizing the size and complexity of the reservoir. This object is realized, at least in part, by making specific utilization of the different fluid condition tolerance levels among the several subsystems so as to achieve a higher level of power/volume ratio.

According to the invention, in a hydraulic system having a plurality of subsystems, each with its own means for withdrawing fluid from a given reservoir (such as a multi-pump system), the number of supply outlets of the reservoir equals or exceeds the number of return inlets, and an internal apertured conduit, providing means for substantially containing and directing fluid, extends between at least one inlet and an outlet. The hydraulic system is arranged so that the return flow to that inlet is greater than the supply flow demanded from the outlet with which it is associated. Thus, a portion of the return flow may pass directly through the conduit means to the outlet and another portion of the return flow may pass through the apertures of the conduit into the reservoir. This arrangement decreases the effective exchange rate (oil turn-over per unit of time) of fluid in the reservoir and thus provides more dwell time for de-aeration for the fluid portion entering the reservoir. The velocity of fluid returning to the reservoir is reduced, comparatively, minimizing turbulent aeration or foaming. Preferably, all of the outlets and inlets of a reservoir in a system according to the invention, and which are utilized in managing fluid flow according to the invention, are disposed so as to be below the normal minimum fluid level in the reservoir.

When internal apertured conduits are provided between respective inlets and outlets so that a significant portion of return fluid is recirculated directly to an outlet, that fluid which does return to the reservoir remains there longer. The effective exchange rate, or net fluid withdrawal rate from the bulk of fluid in the reservoir, is decreased, increasing the dwell time for "reconditioning" of the fluid, including time for de-aeration, cooling and settling out of contaminants. An advantage of the invention therefore is that withdrawal for a given subsystem may be made from a selected portion of the reservoir according to the level of conditioning of the fluid required by that system. For example, fluid for a hydrostatic transmission may be drawn from the lower levels of the free bulk of fluid in the reservoir while a less sensitive system may be supplied from an outlet to which return fluid has been substantially directly conducted or recirculated by an internal (apertured) conduit.

Another feature of the invention is its potential for eliminating (or at least reducing the duty of) a charge pump and hence also a charge pressure relief valve in a subsystem. The direct channeling by apertured conduit between an inlet and an output, where the return flow to the inlet is greater than the damand at the outlet, can result in a supercharging of the supply flow at the outlet while the apertures of the conduit provide the pressure relief function.

Thus in a hydraulic system according to the invention, bringing together selective distribution and/or combination of return flows of fluid to a reservoir and specific and substantially controlled transfer of portions of the return flows within the reservoir, between one or more inlets and outlets, may be used to create a plurality of supply flows differentiated according to subsystem need while, at the same time, minimizing reservoir size compared with a conventional reservoir necessary to supply the same subsystems.

DESCRIPTION OF THE PREFERRED EMBODIMENT

The exemplary preferred embodiment and environment is the hydraulic system of a self-propelled combine harvester. The hydraulic system is shown in simplified schematic form in FIG. 1.

The system is largely conventional except for the structure of the reservoir 10 and the routing of supply lines and return lines to and from it. There are three outlet or supply ports, 12, 14 and 16, serving the main hydraulic, reel drive and hydrostatic transmission subsystems, respectively. And there are two return or inlet ports, main and reel 18 and hydrostatic transmission 20.

Figure 1:
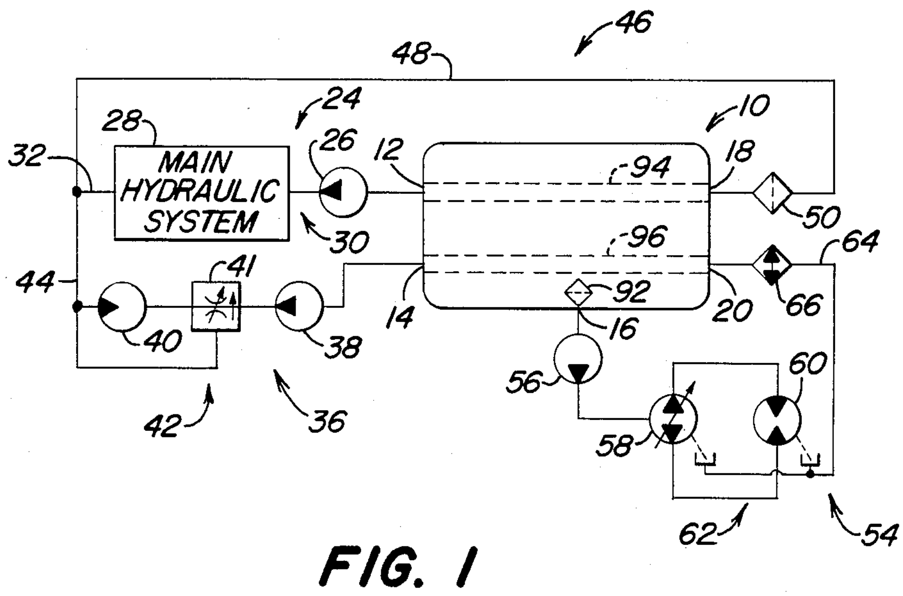
FIG. 1 is a greatly simplified schematic circuit diagram of a hydraulic system for a combine harvester embodying the invention.

The first or main hydraulic subsystem 24, connected to and supplied through outlet port 12, consists of main pump 26 and various hydraulically actuated devices powered by the pump 26 and indicated only collectively by block diagram 28 in FIG. 1. The hydraulic lines connecting the pump 26 and the devices 28 are indicated collectively by the numeral 30. The return flow of this first subsystem 24 is collected into a first subsystem return line 32.

A second or reel drive hydraulic subsystem 36, connected to and supplied through outlet port 14, drives the combine header reel (not shown) and includes a reel pump 38, reel motor 40, reel speed control 41 and reel drive system hydraulic lines indicated collectively by 42 and including a reel return line portion 44.

A third hydraulic system portion 46 comprises a combined return line 48 carrying the combined returns from the first (main) and second (reel) hydraulic subsystems 24, 36, delivered through their respective return lines 32 and 44. This combined return flow is passed through a conventional oil filter 50 and delivered to main and reel return port 18.

A fourth hydraulic system portion, subsystem 54 connected to and supplied through outlet port 16, serves the hydrostatic transmission of the harvester. Principal components include charge pump 56, variable displacement transmission pump 58 and fixed displacement motor 60. These components are connected by hydraulic lines indicated collectively by 62. A return line portion 64 takes the hydrostatic transmission case drain flow through cooler 66 to the return port 20.

In the operation of a combine harvester, the part played by a typical hydraulic system of the type described only partially above is conventional and well understood. An internal combustion engine provides mechanical power for the hydraulic pumps and other components. Transmission of power from the several hydraulic pumps to the hydraulically actuated devices is controlled by the combine operator through a conventional system of controls and ancillary components (not shown). The fourth or hydrostatic transmission hydraulic subsystem 54 provides variable speed propulsion, forward and reverse. The first or main hydraulic subsystem 24 includes, for example, actuators for swinging the unloading auger and controlling threshing cylinder speed and also adjusting the height of a forward mounted header which gathers crop material from a field as the machine advances. The reel (not shown), carried by the header and driven by the second hydraulic subsystem 36, helps to guide and gather crop material into the header for eventual transfer to the body of the combine for processing.

Figure 2:
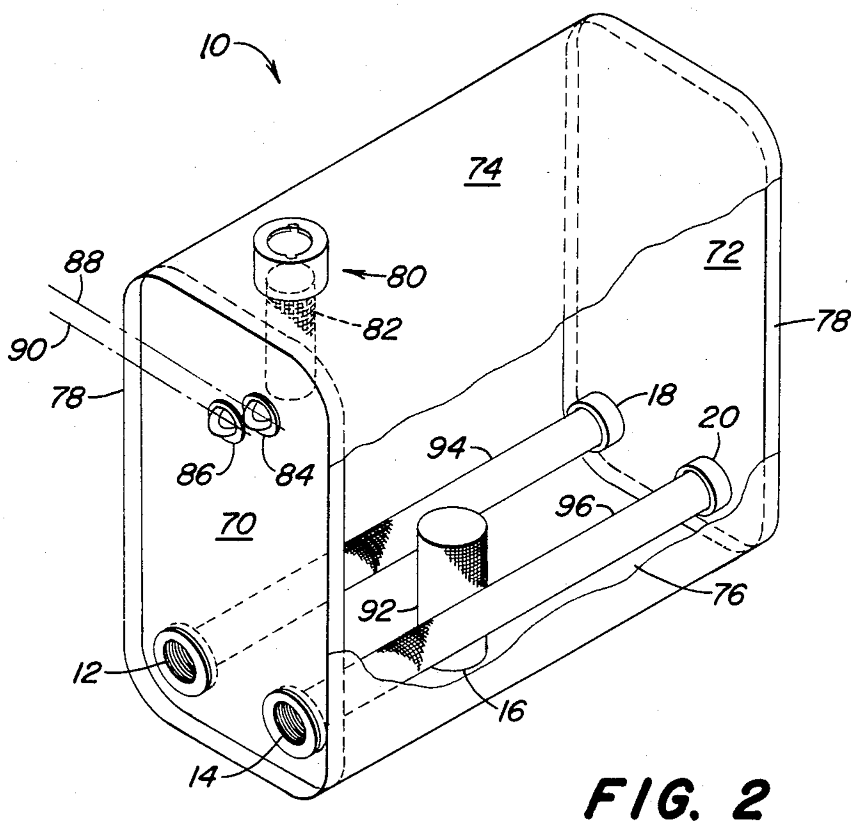
FIG. 2 is a semi-schematic perspective view of the reservoir for the hydraulic system, partially cut away to show the internal foraminous delivery tubes.

Turning now to the structure of the reservoir 10, shown in some detail in FIG. 2, and dealing first with its conventional aspects—the shell of the reservoir is formed by opposite end walls 70, 72, top and bottom walls 74, 76, respectively, and opposite sides 78. A filler neck assembly 80 carried in the top wall 74 includes a strainer 82.

Upper and lower sight glasses 84, 86, respectively, mounted in end wall 72 are placed so as to permit visual checking that hydraulic fluid level in the reservoir 10 is maintained close to a nominal desired level 88 (between the sight glasses) and above a minimum recommended operating level 90 (adjacent the lower sight glass 86). The hydrostatic transmission supply port or outlet 16, carried in the bottom wall 76 of the reservoir, is covered by a conventional suction strainer 92. The tank is proportioned so that the several inlet and outlet ports remain below fluid level for all reasonable combinations of "drawdown", machine inclination and operator error.

An unconventional aspect of the reservoir 10, directly concerned with the invention, is the presence of an apertured or foraminous delivery tube providing direct fluid communication between a return inlet port and a supply outlet port of the reservoir. In the present exemplary embodiment, a pair of delivery tubes 94, 96, are spaced apart and parallel to each other and disposed so as to be generally horizontal when the reservoir 10 is mounted in the combine and the combine is on level ground. These tubes constitute apertured conduits providing substantially direct fluid communication respectively between return inlets 18 and 20 and supply outlet ports 12 and 14. As in this example, the delivery tubes 94, 96, may be made of wire mesh and tubular in form. The presence of foramina or apertures in a delivery tube permits flow or exchange of hydraulic fluid either inwards or outwards through the wall of the tube depending on any pressure differential across the wall or the tube.

An important principle of the invention is to design the system so that in operation, there is a net flow (maintained within a predetermined desirable range) of hydraulic fluid outwards through the wall of a delivery tube into the bulk of fluid in the reservoir 10. In practice, this includes, for any one delivery tube, combining return flows within the overall hydraulic system and/or connecting a particular return line so that the return flow to that given tube is greater than the supply flow demanded at its opposite end. This excess return results in a net outward flow of return fluid through the tube wall into the reservoir as well as potentially supercharging the supply flow at the outlet. The foramina of the supply tube, communicating with the relatively unrestricted space of the inside of the reservoir 10, function also as a "relief valve" so that a functionally satisfactory equilibrium pressure distribution in the respective subsystem may result. The delivery tubes also function as return flow diffusers, effectively reducing the velocity of return flow entering the reservoir so as to minimize turbulent aeration and foaming of the fluid. If the system is proportioned so that the fluid supply to a pump is significantly supercharged and cavitation avoided, pump life may be appreciably lengthened, compared with an uncharged pump.

In the present embodiment, it is appropriate to use a pair of delivery tubes 94 and 96, respectively. As indicated in FIG. 1, tube 94 supplies, through outlet 12, only the main hydraulic subsystem 24 but receives a return, through inlet 18, of the combined returns of the main subsystem 24 and the reel subsystem 36. Clearly then the return flow at 18 will exceed the supply flow demanded at outlet 12.

In the case of the second delivery tube 96, the desired excess of return flow over supply flow demanded is achieved by "switching" systems rather than combining flows, the systems of course having the necessary disparity of flows.

Exemplary flows in the present embodiment may be as follows: supply flows in liters per second of 1.03, 0.60 and 0.87 for the main, reel and hydrostatic transmission hydraulic subsystems 24, 36 and 54, respectively, drawn through outlet ports 12, 14 and 16, respectively. Return flows of the combined main and reel subsystems through inlet port 18 and of the hydrostatic subsystem through inlet port 20 at 1.63 and of course, 0.87 liters per second, respectively. Thus, for each of the delivery tubes 94, 96, there is an excess of return flow over supply flow so that there is a net flow outwards through the foramina of the tubes into the reservoir.

It is an aspect of the invention to route and connect the several hydraulic subsystems so that in each, any tolerance for recirculated or "unconditioned" fluid in its supply flow is at least partially utilized. Essentially, each subsystem is fed as much "used" or unconditioned fluid as it will accept. Key links in the system are the delivery tubes 94, 96 whose functions include diffusion and reduction of velocity of those portions of the return flows which do reenter the reservoir and acting as "bypass" conduits for that portion of the return flow which passes directly to the supply flow outlets.

In this example, the devices included in the main subsystem 24 (and described partially above) constitute a subsystem which is preferably supplied with clean fluid but which will tolerate a significant amount of entrained air. Its supply of fluid is drawn through outlet 12 from delivery tube 94 which receives at its opposite end (inlet port 18), the combined return flow of the main subsystem 24 and the reel subsystem 36. This return flow is relatively warm because of the heat typically generated by the reel subsystem 36 but also relatively clean because of a particular placement of filter 50. The return flow at 1.63 liters per second exceeds the required supply flow of the main system 24 by 0.60 liters per second so that the main subsystem supply flow is supercharged and consists substantially of recirculated or "bypass" fluid passing directly through the length of the tube 94. The passage of the excess part of this return flow to the reservoir provides it an opportunity for deaeration and cooling.

The components used in the reel drive subsystem 36 are typically tolerant of fluid containing contaminants but preferably should be supplied with cool fluid because of their tendency to generate heat in operation. In this example, the second delivery tube 96 connects the reel supply port 14 with the return inlet port 20 of the hydrostatic transmission subsystem 54. The return flow exceeds the supply flow (0.87 vs. 0.60 liters per second) so that the reel system 36 supply consists substantially of hydrostatic transmission return fluid passing directly through the tube 96 (with no dwell time in the reservoir). The particular placement of the fluid cooler 66 ensures that this fluid is relatively cool but the tolerance of the reel subsystem 36 for somewhat contaminated fluid means that no additional specific filtering must be provided for this supply.

Direct use of the settling and de-aeration capacity and capability of the reservoir is reserved almost entirely for the hydrostatic subsystem 54 which draws its fluid supply conventionally through a suction strainer 92 and outlet 16 in the base of the reservoir. The typical hydrostatic transmission system is best supplied with "air-free" fluid (otherwise efficiency is adversely effected) which is also moderately clean and cool, a condition contributed to by an adequate dwell time in the reservoir.

In the above example, the effective exchange rate through the reservoir has been reduced from 2.50 liters per second $(1.03+0.60+0.87)$ to 0.87 liters per second $((0.60+1.03-1.03)+(0.87-0.60))$. For a given fluid volume therefore, the exchange rate of the bulk fluid in the reservoir is decreased to about one third of that for a conventional reservoir.

Note that achieving the principal objectives of the invention does not depend on the supercharging effect of the delivery tubes 94, 96. It is sufficient to slow down the rate of exchange so that some of the return fluid passes straight through the tubes. The supercharging effect can of course be increased if desired by decreasing the percentage of open area or effective aperture size in the delivery tubes.

Figure 3:
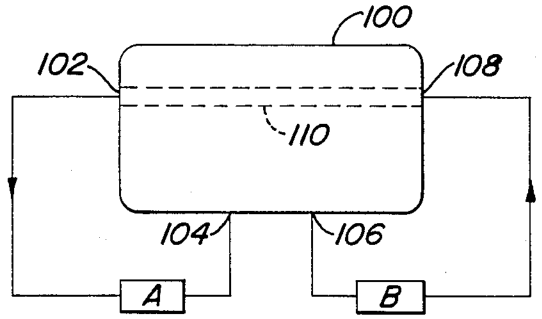
FIG. 3 is a simplified schematic hydraulic circuit diagram of an alternative embodiment of the invention.

A second simple embodiment of the invention is shown in simplified schematic form in FIG. 3. It includes a pair of hydraulic subsystems A and B, each including a pump and one or more hydraulically actuated devices and associated controls, none of which are shown. The systems are served by a fluid reservoir 100 by way of outlet and inlet ports 102, 104 and 106, 108, respectively. As in the first embodiment, it is arranged that all inlet and outlet ports are normally submerged.

The outlet or supply port 102 of subsystem A is connected to the return or inlet port 108 of subsystem B by an apertured delivery tube 10 similar to those described above (94, 96). Preferably, the fluid flow rate in system B will be greater than that in system A and it will be readily apparent that the operating characteristics of this second embodiment will be similar to those of the first and similar advantages of increased dwell time for fluid in the reservoir or reduction of effective exchange rate will accrue. However, it will be noted that this is achieved without any combining of subsystem flows external to the reservoir and also that the number of supply ports and return ports is equal.

The hydraulic systems of the two embodiments described have been simple, complete and self-contained, with all the subsystems included being directly involved in the practice or embodiment of the invention. It will be understood that the invention does not require this, but only that at least one each of the return inlets and supply outlets are connected by an apertured delivery tube and, preferably, that fluid lines are routed so that the return flow to that inlet exceeds the supply requirement at the outlet with which the delivery tube associates it.

Thus, in a hydraulic system including a plurality of subsystems, each with its own fluid supply requirements, fluid flow and routing, both internally and externally of a fluid reservoir serving the system, may be managed so that the essential functions of the reservoir, such as dwell time for deaeration and additional cooling, may be reserved sustantially for the one or more subsystems most in need of these reservoir functions. The size of reservoir required is minimized with consequent advantages in cost and weight reduction and space saving, of particular importance in mobile machines.

I claim:

1. A hydraulic system including a plurality of hydraulically actuated devices comprising:

a fluid reservoir for holding hydraulic fluid and having a plurality of walls, first and second outlets and first and second inlets, said outlets and inlets being normally submerged in the hydraulic fluid;

first and second hydraulic circuit portions including conduit means, substantially outside the reservoir, connecting the first circuit portion between the first outlet and inlet and the second circuit portion between the second outlet and inlet, each circuit portion including a hydraulically actuated device and means for withdrawing respective first and second supply flows of hydraulic fluid from the reservoir and through the respective first and second outlets for actuating the devices and delivering respective first and second return flows of fluid through the respective inlets, the return flow of the second hydraulic circuit portion being greater than the supply flow of the first hydraulic circuit portion; and an apertured conduit carried internally of the reservoir and having an at least partially foraminous wall, connected between and providing substantial fluid communication between the first outlet and the second inlet so that a first portion of the return flow of the second hydraulic circuit portion returns to the reservoir through the foramina of the conduit wall and a second portion of said return flow passes through the apertured conduit directly to the first outlet.

2. The hydraulic system of claim 1 wherein the apertured conduit is tubular and the foraminous wall includes a wire mesh portion.

3. A hydraulic system including a plurality of hydraulically actuated devices comprising:

a fluid reservoir for holding hydraulic fluid and having a plurality of walls, first and second outlets and an inlet, said outlets and inlet being normally submerged in the hydraulic fluid;

first and second hydraulic circuit portions, including conduit means, substantially outside the reservoir, in fluid communication with the respective first and second outlets, each including a hydraulically actuated device and including means for withdrawing respective first and second supply flows of hydraulic fluid from the reservoir and through the outlets for actuating the devices and delivering respective first and second return flows of fluid, the sum of the return flows being greater than the first supply flow;

a third hydraulic circuit portion including conduit means, substantially outside the reservoir, for receiving and combining the first and second return fluid flows into a total return flow and delivering said total return flow to the reservoir inlet; and an apertured conduit carried internally of the reservoir and having an at least partially foraminous wall and providing substantial fluid communication between the inlet and the first outlet so that a first portion of the total return flow returns to the reservoir through foramina of the apertured conduit wall and a second portion of the total return flow passes through the conduit directly to the first outlet.

4. The hydraulic system of claim 3 wherein the reservoir includes a pair of opposite walls each containing one or the other of the inlet and first outlet and wherein the apertured conduit extends substantially linearly between them.

5. The hydraulic system of claim 3 wherein the first outlet and the inlet are contained in opposite walls of the reservoir and are in substantially horizontal alignment.

6. A hydraulic system for a mobile machine comprising:

a reservoir for holding hydraulic fluid and having a plurality of walls and included in said walls, first and second inlets and first, second and third outlets of the reservoir, said inlets and outlets being normally submerged in the hydraulic fluid;

first and second hydraulic circuit portions, substantially outside the reservoir, in fluid communication with the first and second outlets respectively, each portion including at least one hydraulically actuated device and means for withdrawing a supply flow of fluid from the reservoir through the respective outlets for actuating the devices and delivering respectively, first and second return flows of fluid;

a third hydraulic circuit portion, substantially outside the reservoir, for receiving the first and second flows of return fluid and combining them into a main return flow and delivering said return flow to the first inlet;

a fourth hydraulic circuit portion, substantially outside the reservoir, providing fluid communication between the third outlet and second inlet and including a hydraulically actuated device and means for withdrawing fluid from the reservoir through the third outlet for actuating the device and delivering a third return flow of fluid through the second inlet; and a first foraminous conduit having respective opposite ends, carried inside the resevoir, and providing fluid communication between the first inlet and the first outlet so that a portion of the main return flow enters the reservoir through the foramina of the conduit and a second portion passes through the conduit directly to the first outlet.

7. The hydraulic system of claim 6 and further including a second foraminous conduit carried inside the reservoir and providing fluid communication between the second inlet and the second outlet.

8. The hydraulic system of claim 7 wherein each of the third and fourth hydraulic circuit portions contain fluid conditioning elements upstream of the respective first and second inlets.

9. The hydraulic system of claim 8 wherein said conditioning elements include, in the third hydraulic circuit portion, a filter and, in the fourth hydraulic circuit portion, a cooler.

10. The hydraulic system of claim 7 wherein the flow of fluid in the fourth hydraulic circuit portion is greater than the flow of fluid in the second hydraulic circuit portion.

11. The hydraulic system of claim 7 wherein the return flow through the second inlet is greater than the outlet flow through the second outlet.

12. The hydraulic system of claim 6 wherein the first foraminous conduit extends substantially linearly between the first inlet and the first outlet.

13. The hydraulic system of claim 12 wherein the first foraminous conduit is disposed substantially horizontally.

14. Th hydraulic system of claim 13 wherein the second foraminous conduit is disposed approximately parallel to the first conduit.

15. The hydraulic system of claim 6 wherein the wall of the first foraminous conduit is composed at least partially of wire mesh.

16. A hydraulic system including a plurality of hydraulically actuated devices comprising:

a fluid reservoir for holding hydraulic fluid and having a plurality of walls, first and second outlets and at least one inlet, said outlets and inlet being normally submerged in the hydraulic fluid, first and second hydraulic circuit portions, each circuit portion including a hydraulically actuated device and means for withdrawing respective first and second supply flows of hydraulic fluid from the reservoir and through the respective first and second outlets for actuating the devices and delivering respective first and second return flows of fluid, said return flows together constituting a total return flow, and conduit means, substantially outside the reservoir, for controlling the first and second return flows so that at least a portion of the total return flow is delivered to the inlet and so that said return flow portion is greater than the first supply flow; and an apertured conduit carried internally of the reservoir and having an at least partially foraminous wall, connected between and providing substantial fluid communication between the first outlet and the inlet so that a first part of the return flow portion delivered to the inlet returns to the reservoir through the foramina of the apertured conduit wall, and a second part of said return flow passes through the apertured conduit directly to the first outlet.

* * * * *